(12) United States Patent
Etievant et al.

(10) Patent No.: US 7,449,052 B2
(45) Date of Patent: Nov. 11, 2008

(54) COMPOSITE STRUCTURES OF MEMBRANES THAT ARE SELECTIVELY PERMEABLE TO HYDROGEN AND COMBUSTIBLE GAS PROCESSORS USING SAME

(75) Inventors: Claude Etievant, Versailles (FR); Dominique De Lapparent, Paris (FR); Fanny Gaillard, Nozay (FR); Roger Le Cren, Nogent sur Marne (FR); Karine Pointet, Suede (FR)

(73) Assignee: Compagnie Europeenne des Technologies de l'Hydrogene, Marcoussis (FR)

( * ) Notice: Subject to any disclaimer, the term of this patent is extended or adjusted under 35 U.S.C. 154(b) by 253 days.

(21) Appl. No.: 10/468,552

(22) PCT Filed: Feb. 14, 2002

(86) PCT No.: PCT/FR02/00578

§ 371 (c)(1),
(2), (4) Date: Nov. 16, 2004

(87) PCT Pub. No.: WO02/066144

PCT Pub. Date: Aug. 29, 2002

(65) Prior Publication Data

US 2005/0072304 A1    Apr. 7, 2005

(30) Foreign Application Priority Data

Feb. 19, 2001  (FR) .................................. 01 02219

(51) Int. Cl.
*B01D 53/22* (2006.01)
(52) U.S. Cl. .......................... 96/11; 96/7; 96/8; 96/10; 95/55; 95/56; 48/127.9

(58) Field of Classification Search ............. 95/45, 95/55, 56; 96/4, 7, 8, 10, 11; 48/61, 63, 48/76, 127.7, 127.9, 156.5; 422/187, 188, 422/189, 193, 198, 211; 423/650, 651, 652; 429/12, 17, 19, 20

See application file for complete search history.

(56) References Cited

U.S. PATENT DOCUMENTS

| | | | | |
|---|---|---|---|---|
| 5,217,506 A | * | 6/1993 | Edlund et al. | 95/56 |
| 5,498,278 A | * | 3/1996 | Edlund | 96/11 |
| 5,645,626 A | * | 7/1997 | Edlund et al. | 95/56 |
| 6,152,987 A | * | 11/2000 | Ma et al. | 95/56 |
| 6,183,543 B1 | * | 2/2001 | Buxbuam | 96/11 |
| 6,207,132 B1 | * | 3/2001 | Lin et al. | 423/648.1 |
| 6,245,309 B1 | * | 6/2001 | Etievant et al. | 95/55 |
| 6,461,408 B2 | * | 10/2002 | Buxbaum | 95/55 |
| 6,653,005 B1 | * | 11/2003 | Muradov | 429/19 |
| 6,923,944 B2 | * | 8/2005 | Buxbaum | 48/127.9 |

* cited by examiner

Primary Examiner—Jason M Greene
(74) Attorney, Agent, or Firm—Browdy and Niemark, P.L.L.C.

(57) ABSTRACT

The invention relates to a composite structure consisting of a relatively long filtration bar comprising, from the outside, an ultra-thin layer (26) that is selectively permeable to hydrogen and made from palladium or silver alloy. Said layer is disposed on a permeable, rigid, refractory substrate consisting of a more or less solid body (30) that is covered with an intermediary thin layer (28) having a relatively smooth surface. The body (30) and the intermediary layer (28) are made respectively by sintering with fine and ultra-fine Inconel grains. A rigid metallic axial structure (32) is embedded in the body (30). Veinlets (31), which are made in the body (30) through the destruction of thermo-destructible wires during sintering, increase the permeability of the substrate. The invention is particularly applicable to hydrogen-producing combustible gas processors.

14 Claims, 3 Drawing Sheets

COMPOSITE STRUCTURES OF MEMBRANES THAT ARE SELECTIVELY PERMEABLE TO HYDROGEN AND COMBUSTIBLE GAS PROCESSORS USING SAME

BACKGROUND OF THE INVENTION

1. Field of the Invention

The invention concerns improvements to composite structures with membranes selectively permeable to hydrogen and able to be used in combustible gas processors so as to produce pure hydrogen. It also concerns improvements made to these processors owing to the use of the embodied composite structures.

2. Description of the Prior Art

Generally speaking, so as to obtain a high gas flow through a selective filtering membrane, it is necessary to simultaneously satisfy the following four conditions:

- the material making up the membrane needs to be extremely selective and highly permeable to the gas to be extracted;
- the membrane also needs to be as thin as possible, the filtered gas flow being an inverse function of its thickness;
- the difference of partial pressures of the gas to be removed needs to be as high as possible between the upstream and downstream portions of the membrane, the effectiveness of filtering being directly dependent on this difference of pressures;
- the surface of the membrane needs to be as large as possible.

Moreover, it is known that in the particular case of combustible gas processors, the temperature in the reaction chamber is high (generally between 300 and 600° C.), and that owing to this the only material really effective for embodying a membrane and intended to be worked inside this range of temperatures in palladium or a palladium-based alloy, said material being required for clear economic reasons for reducing the total quantity.

In addition, in the case of easily transportable pure hydrogen generators sought in the motor car industry for producing cars with electric traction equipped with combustible batteries of the proton exchanger membranes type (PEM), it is essential for the required electric powers of between 50 and 100 kW that the total volume occupied by the membrane composite structures, and thus by the reaction chamber where they are installed, is as reduced as possible.

So as to embody membranes as thin as possible yet relatively large, various researchers have suggested producing composite structures constituted by a thin film of palladium or a palladium alloy laid on a permeable rigid substrate resisting to the pressure of the environment.

The U.S. Pat. No. 2,958,391 granted to A. J. Derosset describes a composite structure with membranes selectively permeable to hydrogen, said structure including a thin film of palladium or a palladium alloy laid directly on a porous sintered metal substrate in the form of a plate or elongated cylinder. In principle, only the hydrogen filters through the membrane formed by the thin film and penetrates into the permeable porous substrate connected to a collecting pipe. This type of structure is clearly advantageous when the filtering film is sufficiently thick so as to be really effective and when the sintered substrate possesses sufficient mechanical resistance despite its porosity for satisfying the four conditions mentioned earlier.

However, this type of structure has certain defects. The first is the risk of allowing micro-holes to be formed in the filtering thin film owing to the relatively significant surface roughness of the wall of the substrate. This surface roughness results from the relatively large size of the metal grains used required by the minimum sought-after permeability for the porous substrate. The origin of the second risk lies in the fact that, so as to constitute the substrate, the document does not provide selecting a metal having a heat expansion coefficient compatible with the relatively low heat expansion coefficient (namely 11.8 $10^{-6}$/° C. for palladium) of the filtering film. This metal is required so as to allow full selectively of the permeability of this film, by provoking microcracks due to prejudicial differential expansions.

In addition, where the gas mixture including the hydrogen to be filtered is subjected to high pressure and a high temperature, the six conditions mentioned above are insufficient for a structure including a filtering film laid on a substrate. In fact, it is also essential that at the high temperatures and pressures in question (generally 300 to 600° C. and 5 to 15 bars), the metal of the filtering film does not diffuse inside the metal of the substrate which would significantly reduce the selective permeability of the membrane with respect to the hydrogen. This also means that it is essential that the two metals in contact are chemically stable with respect to each other at the temperatures and pressures concerned.

The U.S. Pat. No. 5,498,278 granted to D. J. Edlund proposes a solution to these various problems. Here, the composite structure described includes three elements: (1) a flexible porous intermediate film, non-sintered, textured and heat and chemically stable, is placed between (2) a thin metal film selectively permeable to hydrogen, such as palladium or a palladium, silver and/or nickel alloy, and (3) a permeable rigid substrate. The intermediate film in question is a woven or non-woven film made for example of aluminium, silicon, glass or carbon fibres. It totally separates the external filtering film from the internal permeable rigid substrate and renders them totally independent of each other. Any consideration of direct compatibility, especially chemical or thermic, between the material of this filtering film and that of the substrate is in principle eliminated as virtually useless owing to the presence of this particular intermediate film serving as a barrier. Thus, the substrate could be more of less any and for example made of full metal or dense ceramic material rendered permeable by cuts or perforations. In this structure and according to the document, the filtering film and the flexible intermediate film possess maximum efficiency when they comprise microwaves in two orthogonal directions enabling them to operate as micro-blowers adapted to absorb any differential movement with respect to the substrate. However, these arrangements have one major drawback which is a direct consequence of the non-metallic nature of the intermediate film. Indeed, this renders impossible any genuine weld of the metallic filtering film and the intermediate film which is not so. The reciprocal fixing of these two films having different natures can only be a sort of glueing with relative stability and effectiveness. In these circumstances, at the end of a relatively short period of use comprising successive periods of functioning and stoppage, the filtering film, which undergoes relatively significant heat contractions and expansions and with regard to those (virtually nul) of the intermediate film, shall inevitably come away from its support and shall quickly become fragile, then cracked and finally non-operative. An identical situation would occur if the body of the substrate and the intermediate film or either or both were made of a ceramic material, namely being fragile and brittle.

OBJECT OF THE INVENTION

The first object of the invention is to embody a composite structure with a membrane selectively permeable to hydrogen and including a thin filtering film placed on a rigid porous substrate which retains its constituent qualities at high pressures and temperatures in the presence of a gas mixture including hydrogen.

The second object of the invention is to embody these membranes and substrates which, in the presence of hydrogen, are chemically as well as thermally compatible to one another.

The third object of the invention is to embody these membrane composite structures which possess large surfaces, small individual volumes and shapes enabling them to be easily adapted to their particular conditions of use.

The fourth object of the invention concerns various types of combustible gas processors adapted to optimise their functioning via the usage of these membrane structures.

SUMMARY OF THE INVENTION

According to the invention, an improved membrane composite structure, selectively permeable to hydrogen and constituted by an ultra-thin filtering film with a thickness of several microns and made of palladium or a palladium-based alloy placed on a rigid refractory porous substrate connected to a pipe for collecting the extracted hydrogen, is characterised in that:

said substrate includes a sintered metallic body provided with relatively good mechanical resistance and open pores measuring from few microns up to ten microns;

a thin sintered metallic film, known as an intermediate film with a thickness measuring between twenty and fifty microns and containing open pores smaller than one micron, is placed on the body of said substrate;

the body of the substrate and the intermediate film are made of an alloy or alloys provided with coefficients of heat elongation and expansion in the presence of hydrogen rendering them both compatible with those of the palladium;

the material constituting the intermediate film possesses within the range of the use temperatures of the structure a chemical stability which is satisfactory with regard to the filtering film and the body of the substrate.

According to one additional characteristic, the heat expansion coefficients of the materials constituting the body of the substrate and the intermediate film are lower or at the most slightly higher than that of the material constituting the filtering film.

According to a set of additional characteristics:

the ultra-thin filtering film is made of a palladium-based alloy including silver and/or nickel;

the body of the substrate is embodied from a relatively fine powder having suitable size grading formed from a super-alloy having an extremely low coefficient of heat expansion and preferably being a nickel, chromium or iron-based;

the intermediate film is embodied from an ultra-fine powder with suitable size grading made of nickel or a super-alloy similar to the one used for the body of the substrate;

said filtering film is fixed by micro-welds to the surface grains of said intermediate film.

By means of these arrangements, the filtering film is placed on a thin intermediate film exhibiting extremely small surface roughness constituting a suitable support. This support is indeed a particularly smooth surface which in fact is made up of rounded micro-grains having different shapes and sizes juxtaposed irregularly and welded together during a sintering operation (agglomeration of powders, especially metallic subjected to a suitable pressure and temperature). For this intermediate film to contain open pores, that is to say pores communicating with one another and measuring at the most one micron, the powder grains used need to have an appropriate size grading, that is to say they are about three to five times the maximum size of these pores. The sintering of grains situated outside this range can indeed result in embodying pores with the sought-after size, but more of less closed and therefore relatively impermeable.

So as to place an ultra-thin metallic film on a metallic support, several methods known for their effectiveness are available and in particular vacuum vaporisation, electrolysis, "electroless" and PVD (Physical Vapour Deposition). In the case where this support is sintered, these techniques make it possible to embody immediate, effective and stable micro-welds for the ultra-thin film on the tops of the surface micro-grains of the support.

By using grains measuring several microns, a particularly smooth intermediate film is obtained which directly makes it possible to embody a continuous ultra-thin filtering film with approximately no micro-hole and being between two and five microns thick. Locally, this thickness shall be (1) close to the size of the interval existing between the tops of two juxtaposed top micro-grains of the intermediate film, and (2) larger than the average depth of the micro-gaps separating these tops. This possibility of embodying a thin filtering film means leading to an acceptable cost for the palladium required for the production of a composite structure conforming to the invention, namely a weight of one quarter of a gram and a price in January 2001 of about three US dollars for a square decimetre of two microns thick.

As regards the compatibility in the presence of hydrogen the palladium and alloys constituting the body of the substrate and the intermediate film, the following shall be noted. In accordance with the work entitled "Topics in Applied Physics (Volume 28)"—Hydrogen in Metals 1, page 56, the maximum value of the ratio C=H/M of the densities of atomic hydrogen and palladium in the context of the use of the membrane (typically 10 bars and 300° C.) is assessed at C=2 $10^{-3}$, which results in a linear expansion of $10^{-4}$. Values of the same order are calculated for the silver and the nickel. This results in firstly that the constituents of the composite structures according to the invention are fully compatible with one another in their normal sphere of use, and secondly that these coefficients are lower than the heat expansion of the palladium (about $4.10^{-3}$) during the rise in temperature of these structures in the reaction chamber mentioned earlier.

As regards what provides the heat compatibility of the palladium and of the metal of the substrate, it shall be observed that it assumes particular importance during the rise in temperature of the processing chamber (from the 20° C. of the ambient environment to the 350 or 400° C. reference point). According to the invention, the heat expansions of the body of the substrate and the intermediate film are lower than or at the most slightly greater than the heat expansion of the filtering film. This is essential so that the micro-elements of the filtering film delimited by the tops of the micro-grains to which they are welded are unable to undergo any tensile stress likely to provide micro-cracks of this film. In the case of the palladium and Inconel 600 (nickel, chromium and iron-based super-alloy), the heat expansion coefficients are $11.8\ 10^{-6}/°$ C. for the first and $11.5\ 10^{-6}/°$ C. for the second, this explaining the preferred choice of this super-alloy for embodying the composite structure according to the invention.

On the other hand, if it is desired to use stainless steel 304 (quoted in a large number of publications as being a normal component of the substrate of the composite structures concerned) for embodying a structure according to the invention, its heat coefficient of expansion of 17.4 $10^{-6}/°$ C., considerably greater than that of the filtering film, would prove to be unsuitable for the embodiment of composite structures intended to be used in a processing chamber of the type mentioned above. In fact in this case, the micro-elements of the filtering film would be subjected to a traction stress during the rise in temperature of the processing chamber and as a result could exhibit micro-cracks likely in the long run to considerably reduce the selective permeability of the filtering film with respect to the hydrogen.

In addition to the thermal compatibility of the palladium and Inconel mentioned above, their relative chemical compatibility, that is their negligible speed of intermetallic diffusion within the range of the pressures and usual operating temperatures of the composite structures for the selective filtering of hydrogen according to the invention, is also ensured. Thus results from the experimentally observed properties of the Inconel, the nickel and certain nickel super-alloys including chromium and iron.

According to one first embodiment of a composite structure according to the invention, said substrate is a cylindrical rod provided at one extremity with a collar for removing the extracted hydrogen and, if appropriate, equipped with a vector gas feed collar at the other extremity, said collars and their welding being made of metals compatible with the material of the substrate and stable with regard to hydrogen.

According to a second embodiment according to the invention, said substrate is a sealed plate fixed in a metallic border compatible with the material of the substrate and provided with an orifice connected to said evacuation pipe and, if appropriate, fitted with another orifice opposite the first and connected to a vector gas feed pipe.

According to a first important application according to the invention above, a combustible gas processor, in which a cold plasma reaction chamber fed in adequate conditions by a primary mixture of said gas, water vapour and air, produces a secondary mixture formed of hydrogen and carbon dioxide and monoxide, characterised in that:

said chamber comprises several said membrane structures selectively permeable to hydrogen and having a given shape and dimensions and connected to a common pipe for collecting the hydrogen;

placed immediately close to these structures are electrodes provided with a refractory non-conducting sheath with a high dielectric coefficient, said electrodes having an appropriate shape and dimensions enabling them to effectively cooperate with said structures so as to constitute a unit adapted to produce in response to an appropriate electric feeding, barrier electric discharges generating said cold plasma in the spaces separating the electrodes and the structures.

By means of these arrangements, it is possible to embody improved membrane structures selectively permeable to hydrogen and comprising an adequate substrate enabling them to simultaneously satisfy all the specifications which concern them. As for the shapes to be given to these structures, it shall be hereby noted that long and thin rods equipped with an adequate axial reinforcement make it possible to embody structures having the shape of relatively large and particularly advantageous grids. Indeed, these grids can be easily associated with insulated electrodes having the same shape and dimensions so as to optimise the cold plasma reaction chamber of a combustible gas processor in accordance with the instructions of the international patent application WO 98/28223 filed by one of the inventors of the present invention.

BRIEF DESCRIPTION OF THE DRAWINGS

The characteristics and advantages of the invention shall appear more precisely from a reading of the following description of embodiments given by way of non-restrictive examples with reference to the accompanying drawings on which:

FIGS. 3*a-b-c* represent longitudinal cutaway views of three long rods according to the invention;

FIGS. 4*a-b* represent front views of two structures in the shape of plates, respectively circular and square, of two filtering membranes according to the invention;

DESCRIPTION OF THE PREFERRED EMBODIMENTS

Figures 1A, 1B:
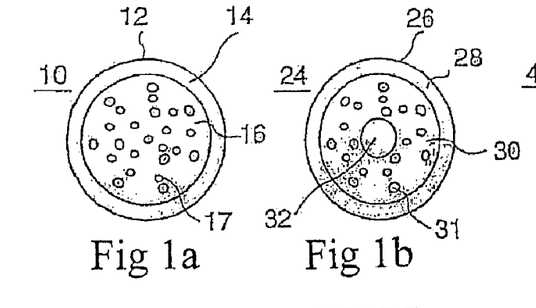
FIGS. 1*a-b-c* represent cross sectional views of two structures with the shape of rods, respectively short and long, structures in the shape of plates, of a filtering membrane according to the invention.

According to the units of FIGS. 1*a* and 2*a-b*, 1*b* and 3*a-b-c*, 1*c* and 4*a-b*, various membrane structures selectively permeable to hydrogen (with the dimensions given hereafter by way of non-restrictive examples) are represented and in particular the structures 10*a-b* in the shape of short rods (diameter 20 mm and length 120 mm), the structures 24*a-b-c* in the shape of long rods (diameter 8 mm and length 400 mm) and the structures 40*a-b* in the shape of circular or elliptic plates 40*a* (diameter between 100 and 200 mm) or rectangular or square plates 40*b* (side between 100 and 400 mm) having a thickness of between 3 and 8 mm. According to the figures shown above, these various structures all include starting form the outside (1) an ultra-thin filtering film 12, 26 or 42, (2) a thin intermediate film 14, 28 or 44, and (3) a rigid sintered substrate 16, 30 or 46 (FIGS. 1*a-b-c*). The ultra-thin filtering film is made of a palladium (70 to 80%) and silver (20 to 30%)

alloy and its thickness is between 3 and 4 microns. The thin intermediate film is embodied from an ultra-fine powder having suitable size grading (range of between 3 and 5 microns for example) made of nickel or a nickel-based super-alloy. It measures up to fifty microns in thickness and contains relatively small open pores smaller than one micron providing it with a particularly smooth surface but with reduced porosity and permeability. The rigid and sintered body of the substrate is embodied from a relatively fine powder with suitable size grading (range of between 30 and 50 microns for example) made of Inconel 600. It contains relatively large open pros measuring from few microns to about ten microns providing it with relatively large porosity and permeability, but also as mentioned earlier a relatively significant surface roughness. It shall be noted that the composition given above for the filtering film 12-26-42 has been given by way of example and that a palladium-based alloy including silver and/or nickel can also be suitable.

Inconel 600 is a stainless steel super-alloy including 75% nickel, 15.5% chromium and 8% iron to which small proportions of carbon, maganese and silicon are added. The melting temperature of the Inconel is 1,370° C., its module of elasticity 200 GPa and its limit of elasticity on traction is 800 MPa. By way of fair comparison, it shall be noted that the values of the three preceding characteristics of Inconel 600 are approximately equal to or slightly greater than those of a material used by several of the inventors of the patents mentioned above, namely type 304 stainless steel. In fact, the preferred choice of Inconel to constitute the substrate 16-30-46 is determined by its coefficient of heat expansion extremely close to that of palladium, whereas the coefficient of heat expansion of the steel in question is relatively far from this. As seen earlier, this coefficient renders this steel unsuitable for a usage in certain treatment chambers. On the other hand, Inconel and nickel-based alloys known for their low coefficient of heat expansion are suitable for all types of combustible gas treatment chambers.

According to FIG. 1b, a structure 24 with the shape of a long rod comprises an axial reinforcement 32 made of Inconel 600. According to FIG. 1c, a plate structure 40 comprises a metallic border 48, also made of Inconel 600. According to FIGS. 2a-b and 3a-b-c, the short rod structures 10a-b or long ones 24a-b-c all comprise at one extremity a collar 20a-b or 34a-b-c and preferably made of Inconel 600 welded to the thin intermediate film 14a-b or 28a-b-c by a compatible welding. These collars 20a or 34a of the membrane structures 10a-24a with the shape of a glove finger (one ultra-thin filtering film 13 or 27 is placed on the extremity section) are intended to provide both removal of the extracted hydrogen and the securing of these structures to a collecting pipe. The short rod 10b or long rod 24b structures comprise a collar 22 or 36 fixed to the other extremity in the place of the ultra-thin film 13 or 27. These collars 22-36 are provided to inject a neutral vector gas (nitrogen for example) into the substrate 16 or 30 so as to drive the produced hydrogen as it is gradually extracted.

Figure 3A:
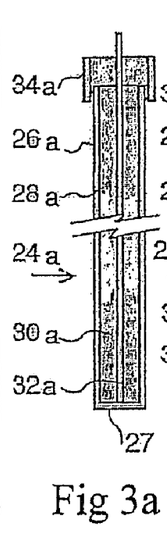
Figures 3B, 3C:
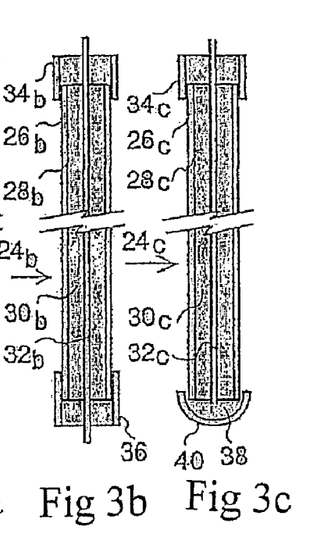

According to FIGS. 3a-b-c, the long rod structures 24a-b-c all comprise a rigid metallic axial reinforcement 32a-b-c made of Inconel 600 which gives them the shape of pencils. The reinforcements 32a-b are full rods 2 mm in diameter and the reinforcement 32c is a hollow rode with external and internal diameters of 3 and 1.5 mm respectively. The two glove finger-shaped membrane structures 24a and 24c differ from each other by the fact that the hollow axial reinforcement 32c opens into a cavity 38 provided in a boat 40 welded to the other extremity of the long rod 24c in the place of the ultra-thin film 27 of the pencil 24a so as to allow the use of a vector gas of the hydrogen extracted by a glove finger-shaped membrane.

The reinforcements 32a-b-c are also made of Inconel 600, a material with advantageous mechanical characteristics adapted to provide the permeable porous bodies of the long pencil structures 24a-b-c incorporating them with a sufficient solidity and stiffness to enable them to be easily manipulated and a good resistance to the impacts inevitably sustained during the time they are used in combustible gas processors mounted on vehicles.

The axial reinforcements 32a-b-c of the pencils 24a-b-c project from the fixing collars 34a-b and 34c-36 so as to be able to be welded to the hydrogen collecting pipe for the first two and to the vector gas injector pipe for the last two. The aim of this arrangement is to improve the effectiveness of the fixings of the structures.

Figure 1C:
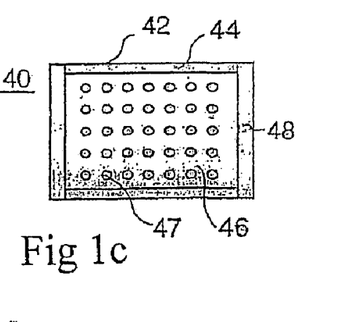
Figure 4A:
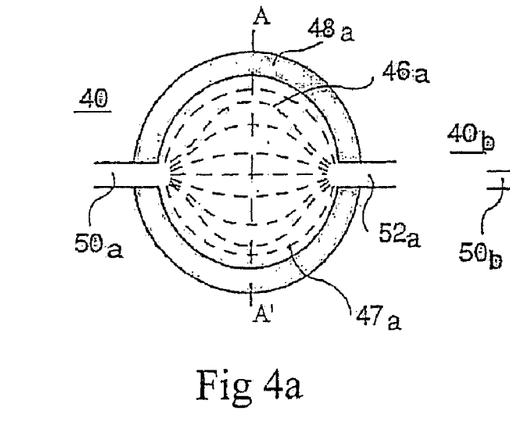

According to FIGS. 4a-b, the circular 40a and rectangular 40b plate-shaped structures respectively comprise metallic borders 48a-b in which the substrates 45a-b are seal-fixed according to the invention. The cross sectional view of these structures embodied along the lines A-A' or B-B' is shown in FIG. 1c.

It shall be noted that in the case of large square or circular plates (for example with a diameter or side exceeding about 10 cm), two piles formed of several relatively fine rigid metallic rods could before embodiment of the substrate 46a-b be placed in the shape of a cross in the borders 48a-b and welded to the latter so as to play the same role as the axial reinforcements 32a-b-c of the long rods mentioned earlier. In the case of large relatively elongated elliptic or rectangular plates, only one of these plies, such as 49 on FIG. 4b, connecting the central portions of their closest border sections could suffice.

The borders 48a-b each comprise two opposing orifices connected to pipes 50a-52a and 50b-52b respectively allocated to one vector gas injection and the removal of the extracted hydrogen. In the absence of any vector gas, the pipes 50a-b could be eliminated.

The substrates 16, 30 or 46 are embodied by means of a suitable sintering (see above) adapted to the sought-after porosity and permeability in moulds having adequate shapes of relatively fine Inconel 600 grains with calibrated size grading and adapted following this operation to generate rigid bodies with significant permeability and porosity containing open pores measuring up to ten microns. Theses moulds with adequate shapes shall be two half-cylinders for the rod substrates and two trays for the plates, one of these trays comprising a recess having a shape identical to the outer shape of the border 48 and a depth identical to its thickness.

Figure 2A:
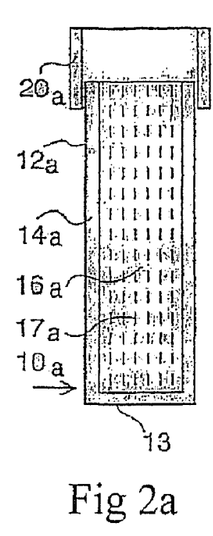
FIGS. 2*a-b* represent longitudinal cutaway views of two short rods according to the invention.
Figure 2B:
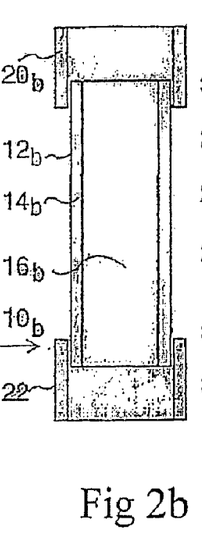

So as to improve the permeability of these substrates, fine wires made of a heat-destructible material are previously placed in the form of several films in the metallic powder mass poured into the mould prior to sintering. During this sintering operation, the wires in question are destroyed and a network of micro-channels or small veins, such as 17, 31 or 47, is established which appears at points on FIGS. 1a-b-c. The small veins 17a-b and 47b represented by the dots on FIGS. 2a and 4b are longitudinal (those of the rods of FIGS. 2b and 3a-b-c have been omitted) and the small veins 47a of FIG. 4a follow curved lines connecting the orifices 50a-52a of the border 48a.

The thin intermediate film 14 is embodied by depositing on the body 16 a suitable gel containing an ultra-fine metallic powder with calibrated size-grading and made of nickel or a nickel-based super-alloy (which could be Inconel 600) formed of small grains adapted to generate following an adequate sintering operation open pores smaller than one micron and communicating with one another. The porosity and permeability of the thin intermediate film 14 (which measures 30 to 50 microns thick) are relatively slight but its surface roughness gives its external surface a particularly smooth condition which is fully suitable as a support for the depositing of an ultra-thin filtering film 2 to 4 microns thick. This ultra-thin filtering film 12 can with reference to the documents published earlier be embodied via a depositing of the palladium and silver alloy carried out by means of any method adapted for this purpose and known for its effectiveness, especially one of those methods mentioned earlier.

By means of the presence of the extremely smooth intermediate film 14, the ultra-thin filtering film 12 is almost perfectly continuous, that is to say almost without any micro-holes or micro-cracks, which provides it with an almost full impermeability to any gas but hydrogen, the rate of the filtered pure hydrogen impurities being able to drop down to about 5 ppm when the thickness of the filtering film is between 4 and 5 microns.

By means of the nature (Inconel 600) of the metallic grains used to embody the porous body 16 and the intermediate film 14, the coefficients of heat expansion of these two components and of the filtering film 12 made of palladium or a palladium/silver alloy of the structures 10a-b, 24a-b-c and 40a-b are approximately identical. This results in minimising as much as possible the problems of differential expansion between the components of the filtering structures according to the invention in the reaction chambers of the combustible gas processors operating at temperatures able to vary between 300 and 600° C. Moreover, it shall be noted that this range of temperatures is the one in which selective permeability is maximum with regard to the hydrogen of an ultra-thin film made of a palladium and silver alloy and that this selective permeability rapidly reduces to temperatures lower than the bottom threshold of this range.

In these reaction chambers, the total pressure can reach between 12 and 15 bars with a partial hydrogen pressure of between 3 and 6 bars. Downstream of the ultra-thin filtering film 12, the hydrogen pressure is by almost 2 bars lower than the partial pressure of the hydrogen existing upstream. Because of this, the ultra-thin membrane 12 can be subjected to a total differential pressure greater than 10 bars.

By means of the approximately full porous body 16 and the thin intermediate film 14, which constitute the substrate of the membrane 12 and give this substrate a high mechanical resistance, the pressure exerted downstream of this membrane is, indeed, without causing any damage for the ultra-thin film 12, applied on compression to the substrate 16 which constitutes a continuous support for the entire surface of the membrane. Because of this, the ultra-thin filtering membrane structures according to the invention can have both large surfaces and reduced individual spatial requirements whilst being adapted to withstand high temperatures and pressures.

Figure 5:
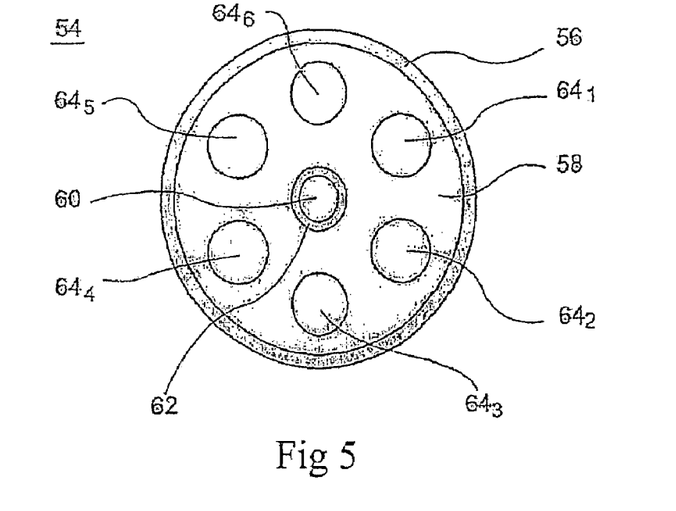
FIG. 5 represents the diagram of a cross sectional view of the reaction chamber of a combustible gas processor producing hydrogen and equipped with structures of filtering membranes in the shape of short rods according to the invention associated with a non-conducting electrode having the same shape.

FIG. 5 represents the cross section of a cold plasma reaction chamber 54 of a combustible gas processor, namely a hydrogen generator, of the type described in the international patent application WO 98/28223 mentioned earlier.

According to FIG. 5, a cylindrical casing with an internal diameter of between 56 and 70 mm and provided with high heat insulation and adapted to withstand internal relatively high pressure and temperature (10 to 15 bars and 300 to 600° C.) surrounds a reaction chamber 58. Installed in this chamber 58 is an axial cylindrical electrode 60 with a length of 200 mm and provided with a non-conducting sheath 62 with a high dielectric coefficient and made of a ceramic material 3 mm thick and giving this insulated electrode an external diameter of 20 mm. Placed fully around this insulated electrode 60-62a small distance away (3 mm for example) are six short cylindrical rod-shaped structures $64_{1...6}$ conforming to one of the models described on FIGS. 2a-b. These rods have the same dimensions as the electrode.

Figure 6:
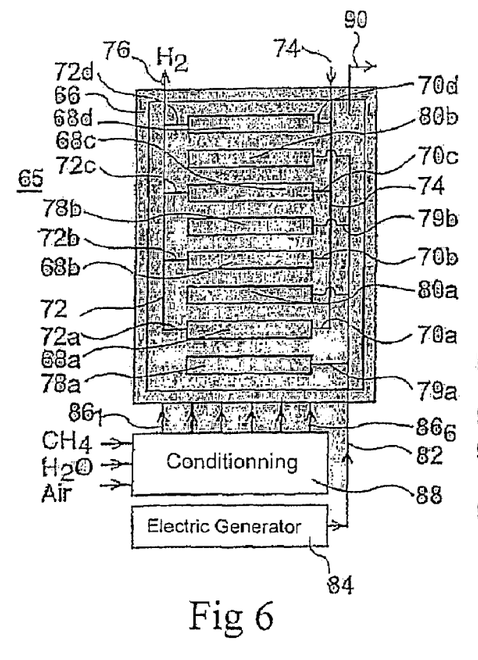
FIG. 6 represents the diagram of a longitudinal cutaway view of the reaction chamber of a combustible gas processor producing hydrogen with an improved yield and equipped with the filtering structures in the shape of long rods according to the invention associated with non-conducting electrodes having the same shape and with baskets containing a suitable catalyst.
Figure 7:
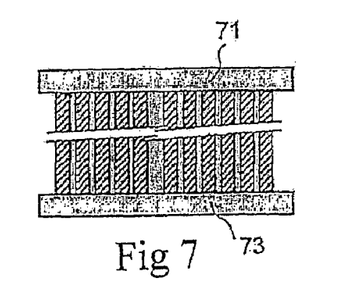
FIG. 7 represents a set of filtering structures or non-conducting electrodes used several times in the reaction chamber of FIG. 6.
Figure 8:
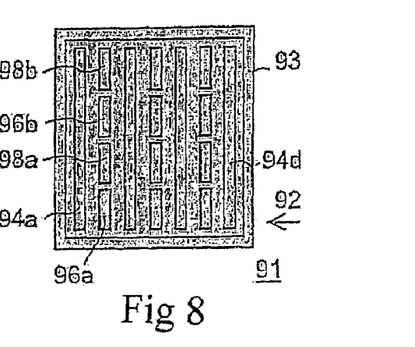
FIG. 8 represents the diagram of a longitudinal cutaway view of a reaction chamber similar to that of FIG. 6 and equipped with filtering structures in the shape of rectangular plates associated with non-conducting electrodes and baskets containing a suitable catalyst, also in the shape of rectangular plates.

FIGS. 6-8 represent the diagrams of longitudinal views of two combustible gas processors whose hydrogen productivity is considerably improved by the use of membrane structures selectively permeable to the hydrogen according to the invention and associated with insulated electrodes and baskets containing a suitable catalyst. The dimensions of these various elements constituting the reaction chambers of these processors are clearly given hereafter solely by way of non-restrictive examples.

According to FIG. 6, the reaction chamber 65 of a processor and intended to be installed on a motor vehicle possesses a cylindrical casing 66 with a diameter and length of 50 cm and conforms to the specifications of the casing 56 of FIG. 5. Placed after one another in this chamber 65 are twenty sets (only four, namely 68a-b-c-d are represented) of the membrane structures selectively permeable to hydrogen according to the invention. These sets of structures 68 have the shape of square grids with a side measuring 300 mm and a thickness of 8 mm. They are constituted by long pencil-shaped membranes of the type with two collars described on FIG. 3b and whose two extremities are welded to two hollow beams 70a-b-c-d and 72a-b-c-d allocated to the vector gas injection for the first ones and to the collecting of hydrogen for the second ones. The hollow beams 70 and 72 project from the grid and are respectively connected to two pipes 74 and 76 which ensure feeding with vector gas (nitrogen for example) for the first and removal of the hydrogen produced in the chamber for the second.

The difference between the pencils of the structures 68 is small (<1 mm) so that the surface filtering the hydrogen of each grid is slightly less that three times the surface of the square it forms. These grids 68a-b-c-d are rigidly fixed to a frame (not shown) installed in the chamber 65 and are separated from one another by gaps of 12 mm.

Installed under the grids 68a-c filtering the hydrogen and fixed to the same frame are electrodes 78a-b, also in the shape of grids externally identical to the grids 68a-c. These grids of electrodes are made up of long pencils similar to those of the grids 68a-c and comprise one axial electrode and one non-conducting sheath respectively in accordance with the constituents 60-62 of the insulated electrode shown on FIG. 5. The pencils of the grids 68a-b and 78a-b are placed zigzag and the size of the free spaces separating them are at least 2 mm.

FIG. 7 represents the outer aspect of the structure grids filtering the hydrogen and of the grids of electrodes mentioned above. The square grids of the processor of FIG. 6 measure 30 cm sideways and each include thirty-four pencils measuring 28 cm long and 8 mm in diameter and spaced from one another by 0.8 mm. The extremities of these pencils are fixed to tow projecting beams 71 and 73 measuring 36 cm long and 1 cm in diameter. In the case of a grid of filtering structures, these beams 71-73 are pipes allocated respectively to vector gas injection and removal of the extracted hydrogen. In the case of a grid of insulated electrodes, the beams 71-73 are insulated electric conductors ensuring feeding of these electrodes, one extremity of one of these conductors being adapted so as to establish a link with a generator. This grid of electrodes could first of all constitute a bare unit to which a ceramic moulding from a casting is then applied during a sintering operation. In addition to their respective individual functions, these beams 71-73 also ensure fixing of the two types of girds concerned to the frame mentioned earlier.

Installed under the grids 68b-d and fixed to the frame mentioned earlier are two square metal baskets 80a-b having a rigid border and measuring 300 mm sideways like the filtering grids 68a-b-c-d but with a thickness of 10 mm so that the differences separating these baskets and grids are about 1 mm. These baskets 80a-b contain a known type of catalyst formed of ceramic granules coated with a mixture of iron and chromium oxides which is a specific of the "water-gas shift" reaction within the range of temperatures of 300 to 550° C. (which corresponds to the maximum effectiveness range of the filtering structures according to the invention). This reaction shall be presented hereafter. As for the baskets, in view of their constitution, these are fully permeable to the gases.

According to the international patent application WO 98/28223 mentioned above, the electrodes 78a-b are connected by electric high insulation conductors 82 to a generator 84 delivering an extremely high alternative voltage (10 to 20 k-V) at a high frequency (for example 1 MHz) pulsed with a period of for example 1 ms.

Pipes $86_{1\ldots6}$ installed at the outlet of a gas conditioning cell 88 ensure the feeding with gas for treating the reaction chamber 65 and to this effect project onto orifices regularly distributed at the bottom of the casing 66 of this chamber. By means of the shape of the grids of the two electrodes 78a-b and the four filtering structures 68a-b-c-d and the high permeability of the baskets of granules 82a-b, the various gas mixtures circulating in the reaction chamber 65 do so in the best possible conditions.

The gases provided by the pipes 86 constitute a suitable first mixture of combustible gases (hydrocarbon or alcohol in particular), water vapor and air. This suitable mixture is embodied in the conditioning cell 88 which each receives the three gases concerned so as to be agitated, heated and compressed and then finally delivered with relative flows and adequate partial pressures at a total pressure of between 10 and 15 bars and a temperature of between 300 and 500° C. as required by the reaction chamber 65 so as to operate in conditions providing as best as possible the sought-after results. A canalisation 90 ensures evacuation of the carbon dioxide produced in the chamber 65.

According to the FIG. 8 shows the reaction chamber 92 of a processor 91 using other filtering structures according to the invention. The description of this chamber 92 shall only concern what distinguishes it from the chamber 66 of the processor 65 of FIG. 6. Placed in this chamber 92 are two groups with intervals of 12 mm, each group including twenty filtering structures according to the invention (only four structures 94a-b-c-d being shown) in the form of large rectangular plates (measuring 30×20 cm for example) with a thickness of 8 mm conforming to the one described on FIG. 4b. Placed alternatively between two filtering plates 94 are two insulated electrodes, such as 96a-b, in the form of rectangular plates measuring 15×20 cm and being 8 mm thick and two rectangular baskets with a perforated rigid border, such as 98a-b, also measuring 15×20 cm but with a thickness of 11 mm and filled with catalyst granules identical to the preceding ones. So as to increase the effectiveness of conversions made in this reaction chamber, the direction of circulation of the vector gas in the filtering structures 94a-b-c-d and that of the reactive mixture injected into the chamber shall be inverted in relation to each other. All of these forty sets of plates have a square cross section measuring 40 cm sideways with a length of 60 cm. A cylindrical casing 93 with a diameter of 60 cm and 80 cm long shall be suitable for said sets. The total surface of these membrane structures brought together is 960 dm². The feedings and evacuations concerning this chamber 92 of FIG. 8 are, like all those of the chamber 58 of FIG. 5, identical to those of the chamber 65 of FIG. 6. It shall be noted that the plates described placed in the direction of circulation of the gases can on the other hand be placed perpendicular to this direction with passage alteratively placed at either of their extremities.

Figure 9A:
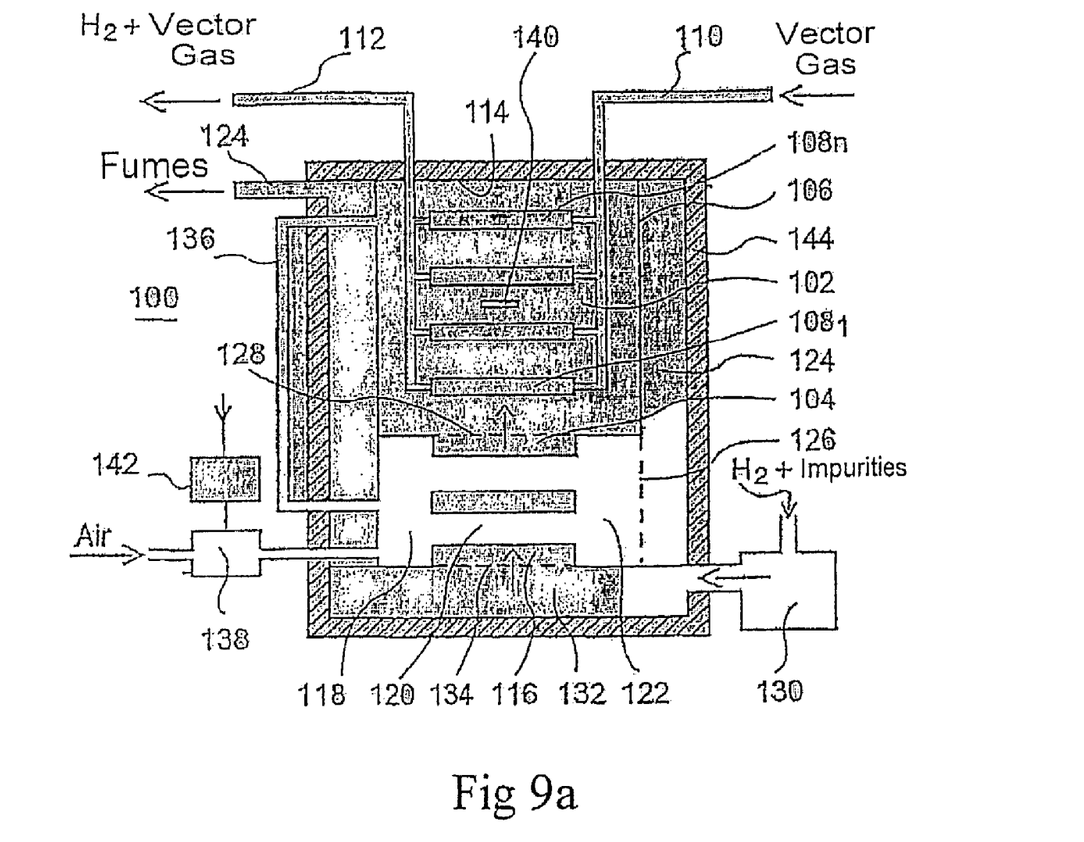
FIGS. 9*a-b* represent the diagram and a partial cutaway view of a hydrogen purification device and especially for purifying the hydrogen generally available on the market.
Figure 9B:
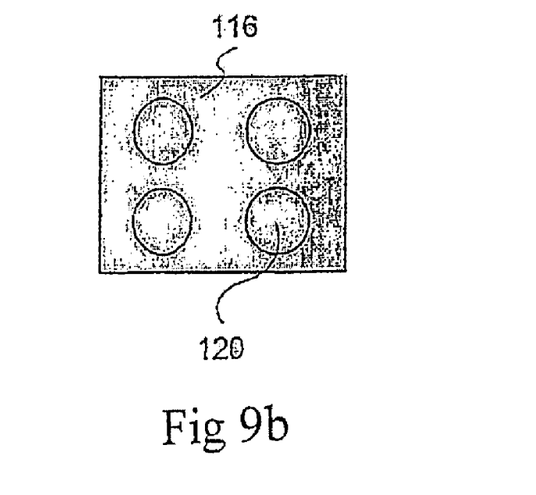

FIG. 9a represents the diagram of a longitudinal section of a hydrogen purification device, and FIG. 9b is a cross sectional view of its heating chamber. The hydrogen to be purified is in particular normal industrial hydrogen (containing about $10^{-4}$ impurities) with the aim of reducing this proportion of impurities to about 5 ppm. This device 100 mainly includes a filtering chamber 102 and a heating chamber 104. The filtering chamber 102 comprises a stainless steel cylindrical casing 106 containing a relatively large number of membranes $108_{1\ldots n}$ selectively permeable to hydrogen in the form of square grids measuring 30 cm sideways according to FIG. 7. The number of grid membranes is, along with the pressure, one of the parameters determined by the flow of the pure hydrogen to be obtained. Each of the grid membranes 108 is connected to two pipes 110 and 112 respectively allocated to vector gas feeding and the collection of the extracted pure hydrogen, said pipes traversing the downstream bottom 114 of the filtering chamber 102.

The heating chamber 104 includes a boiler 116 and a burner 118 placed upstream of several pipes 120 with high heat conduction which traverse the boiler 116 (see FIG. 9b) and open into a cavity 122 communicating with a chimney 124 via a perforated partition 126. The chimney 124 constitutes a pipe with a ring-shaped cross section which surrounds the wall of the filtering chamber 102. The boiler 116 is separated from the filtering chamber 102 by a party-wall 128 provided with perforations, adapted to evenly distribute the flow of hydrogen to be purified entering the chamber 102. The boiler 116 is fed with hydrogen to be purified by a compressor 130 which generates an excess pressure of between 4 and 10 bars and opens into a distribution box 132 communicating with the boiler 116 by a perforated wall 134. Close to the downstream bottom 114 of the filtering chamber 102, a pipe 136 is connected for collecting the residual hydrogen and ends at the entrance of the burner 118 which is moreover fed with compressed air by a compressor 138.

Placed at the centre of the filtering chamber 102 is a thermo couple 140 connected (by means, not shown) to a regulation device 142 adapted to produce a signal for controlling the flow from the air compressor 138. The unit formed by the filtering chamber 102, the heating chamber 104 and the ring-shaped chimney 124 is heat insulated with the aid of a non-conducting sheath 144 with rockwool.

With reference to FIGS. 5, 6 and 8, it shall be noted that the aim of conditions essential to correctly feed the described reaction chambers 58-65-92 with the primary mixture, in this case of a methane gas to be converted into hydrogen, is to enable these reaction chambers to carry out as best as possible the conversions defined by the following chemical equations:

$$CH_4+O_2 => CO_2+2H_2 (1) => \text{strong exothermic reaction}$$

$$CH_4+2H_2O => CO_2+4H_2 (2) => \text{strong endothermic reaction}$$

$$CH_4+H_2O => CO=3H_2 (3) => \text{moderate endothermic reaction}$$

$$CO+H_2O => CO_2+H_2 (4) => \text{moderate exothermic reaction}$$

In the case of the reforming of a primary gas mixture containing an alcohol or a hydrocarbon, other than methane, similar equations can be written.

Carrying out as best as possible the above conversions signifies in particular to ensure that the quantity of heat consumed by the highly endothermic reaction (2) is approximately equal to or slightly lower than the quantity of heat freed by the highly exothermic partial oxidation reaction (1). A good combination of theory and experimentation makes it possible to attain this objective. The same also applies for the two moderately exothermic (4) and endothermic (3) reactions.

The three conversions defined by the equations (1)-(2)-(3) are carried out fully in the reaction chamber 58 (FIG. 5) and in the sections of the chambers 65 and 92 (FIGS. 6 and 8) occupied by the filtering structures 68*a-b* or the sections of the plates 94*a-b-c-d* associated with the insulated electrodes 78*a-b* or 96*a-b*. The conversion according to the equation (4) above, known as "water-gas shift", is ensured by the catalyst action effected by the granules coated with a mixture of iron and chromium oxides of the baskets 80*a-b* and 98*a-b* of FIGS. 6 and 8. The portions of the filtering plates 94 placed on both sides 0.5 mm from the baskets 98*a-b* directly cooperate with the catalyst contained in these baskets With reference to FIGS. 5, 6 and 8 and the instructions of the international patent application WO 98/28223 mentioned earlier, by means of the presence of the high dielectric coefficient nonconducting sheaths of the electrodes 60-78-96 installed immediately close to the hydrogen filtering structures 64-68-96, an extremely short HF electric field (from 3 to 4 microseconds) is uniformly created periodically (1,000 Hz) in the free spaces traversed by the primary mixture in question which separate these sheaths from these filtering structures. This field generates barrier electric discharges in the spaces concerned which create a cold plasma (small population of extremely high energy electrons embedded in a medium passive at moderated initial temperature) which plays the same role as an appropriate chemical catalyst. A series of reactions defined by the equations (1)-(2)-(3) above then occurs whose period of persistence is in particular greater than the period of the barrier electric discharge which started it. A secondary mixture formed of hydrogen and residual gases, mainly including carbon monoxide (a poison for PEM type combustible batteries) and carbon dioxide, is produced on this occasion.

The structures 64 of membranes permeable to the hydrogen of the reaction chamber 58 (FIG. 5) extracted the hydrogen as it was gradually produced. This makes it possible for the three reactions (1), (2) and (3) concerned to be effected as best as possible in a particularly reduced required space. But this chamber 58, whose architecture exactly takes up the information of the patent application quoted as a reference, also produces the mixture of residual gases mentioned earlier which, despite the capacity of producing the hydrogen it still possesses is, according to this information, is only recycled as heat in the boiler of the conditioning cell associated with the reaction chamber.

In the reaction chambers 65 and 92 of FIGS. 6 and 8, this particular capacity possessed by carbon monoxide is collected effectively with an excellent yield (via the elimination of the inverse reaction and displacement of the chemical balance in the direction of a more complete reaction). This is effected by means of the immediate presence downstream of the insulated electrodes 78*a-b* and 94*a-b* of the baskets 80*a-b* and 98*a-b* filled with catalysing granules of the "water-gas shift" reaction according to the equation (4) mentioned above and installed immediately close to the filtering membrane structures 68*a-b* and 94*a-b*.

It shall be noted that it is easy to install in the reaction chamber 54 of FIG. 5 structures with rods twice longer than those described, and, above the insulated electrode 60-62, a basket of the same shape containing a suitable catalyst so as to obtain the same results as those provided by the chambers 65 and 92.

In these circumstances, starting from a suitable combustible gas, water vapour and air primary mixture, the processor reaction chambers 65 to 92 with relatively reduced spatial requirement, improved by the use of the membrane structures according to the invention at high pressure and a high temperature alternately associated with insulated electrodes and baskets with an adequate catalyst, produce in separate evacuation canalisations, such as 76 and 90, with considerable effectiveness and thus a high yield, basically almost pure hydrogen and carbon dioxide (a residue of three components of the initial primary mixture is however generally added to the latter). The origin of this high yield resides in the fact that the carbon monoxide present in the secondary mixture produced by the pair formed by the insulated electrode 78*a-b* or 96*a-b* and the filtering structure 68*a-c* or 94 (first section) is immediately treated by the pair formed by the catalyst basket 80*a-b* or 98*a-b* and the filtering structure 68*b-d* or 94 (second section) which follows it along the path of the reactive gas mixtures circulating in the reaction chamber.

The hydrogen produced in the reaction chambers 58-65-92 is generally intended to be used for feeding the PEM type combustible batteries mentioned earlier. Experience has shown that, so as to feed such a battery delivering 100 electric W, it is necessary to have available about 1 $dm^2$ membranes selectively permeable to the hydrogen. As a result, with the six short rod membranes 20 cm long and a diameter of 2 cm, the reaction chamber 58, whose internal diameter measures up to 12 cm at the most and having a length of 30 cm, is able to provide a sufficient quantity of hydrogen for feeding a PEM battery producing 750 W which allows advantageous applications in a large number of fields, especially in the leisure activities industry.

Similarly, with the grid membrane structures 68*a-b-c-d* of FIG. 6 which each have a total filtering membrane surface area of about 26 $dm^2$, it is possible to produce a reaction chamber with a diameter and length of 50 cm containing ten electrode/structure pairs and ten basket/structure pairs, said chamber being able to produce a hydrogen flow able to feed a PEM battery providing 52 kW, which corresponds to the electric power required by the motor vehicle industry for feeding its future average power reduced pollution vehicles.

Similar considerations can clearly be applied to the reaction chamber 92 of FIG. 8 which, with a reduced spatial requirement, comprise plate filtering structures able to feed a PEM battery delivering 96 kW.

With reference to FIGS. 9*a-b*, the hydrogen to be purified, which is cold and at low pressure in the compressor 130, is injected compressed into the distribution box 132 and into the boiler 116. Throughout the start of the phase for putting the purification device 100 into action, this boiler 116 is itself cold so that all the hydrogen injected by the compressor 130 passes through the filtering chamber 102 and then the recovery pipe 136 so as to end up at the entrance of the burner 118. This is because the grid membranes $108_{1 \ldots n}$ selectively permeable to hydrogen and occupying the major portion of the filtering chamber 102 are cold and are thus unable to operate, their operating temperatures being between 300 and 550° C. In the burner 118, the injected hydrogen is mixed with the compressed air provided by the compressor 138 and the mixture is immediately ignited. The flames traverse the heating pipes 120 and the combustion gases are evacuated by the ring-shaped chimney 124. The hydrogen to be purified circulates in the boiler 116 sweeping the hot walls of the heating pipes 120. During this passage, it rapidly heats up and then penetrates the filtering chamber 102 by traversing the perforations of the party wall 128. It is then at a temperature inside a range enabling the membranes 108 to function correctly. Moreover, the filtering chamber 102 is heated by the ring-shaped chimney 124 lagged by the insulating sheath 144 surrounding it. In addition, the thermo couple 140, which sends a signal to the device 142 for controlling the flow of the air compressor 138, makes it possible to adjust to an optimum value the temperature of the filtering chamber 102. As soon as this is done, pure hydrogen is extracted by the membranes 108 operating in the best possible conditions and then is evacuated by the collecting pipe 112 driven by the vector gas introduced into the pipe 110. Any resultant residual hydrogen possesses a coefficient of impurities much higher than that of the hydrogen to be purified initially injected but having a pressure lower than by at least one or two bars than that of the latter. This residual hydrogen is evacuated by the recovery pipe 136 and injected into the burner 118 where it is used as indicated earlier. Accordingly, a normal industrial hydrogen purification device is embodied able to have available pure hydrogen (impurity rate lower than 10 ppm) enabling it to be used to feed PEM type combustible batteries in the best possible conditions.

In the case where the period for needing this extremely pure hydrogen is relatively short (for example several hours), the hydrogen purification device described on FIGS. 9a-b can be significantly simplified. By way of example, the filtering chamber shall contain a single membrane of the short rod type described on FIG. 2b, and the heating chamber shall contain an electric heating resistor fed by a current adjusted according to the temperature of the filtering chamber measured by a thermo couple. The heat insulation or lagging sheath shall be retained but the chimney shall of course be eliminated, as well as the pipe for collecting effluent from the filtering chamber. After a short period of usage, the hydrogen with a relatively high rate of impurities, which shall then be located in the filtering chamber, shall be evacuated via action of an appropriate valve.

In the case where the irreducible impurity rate of the extremely pure hydrogen produced by a purification device according to FIG. 9 or by a processor according to FIGS. 5, 6, 8 would mainly originate from the carbon monoxide and because of this would be regarded as still being too much for feeding a PEM type combustible battery, the purified flow of hydrogen could be introduced into an additional treatment chamber functioning at temperatures of between 200 and 250° C. embodying the elimination of the CO by a well-known suitable catalyst in the industry concerned. This operation can make use of several types of catalysts and in particular make use of the ruthenium deposited on aluminium granules. This is a reverse transformation (methanation) of the one defined by the chemical equation (3) mentioned above, that is to say: $CO+3H_2 => CH_4+H_2O$. It adds to the previously pure hydrogen obtained a mixture of methane and water vapour fully supported by the batteries concerned.

The invention is not limited to the embodiments described above.

In this respect, it shall be noted that short or long rod structures, with or without a glove-finger shape, are able inside the same reaction chamber to be associated with insulated electrodes and catalyst baskets in the form of plates. As for the dimensions of these various structures, they shall mainly be determined by considerations of the resistance of materials, having regard to the maximum amplitude of the impacts it could be exposed to during their use.

Moreover, it shall be noted that Inconel 600 shown above could be preferably replaced by other Inconel grades or even by certain types of Hastelloy. These Hastelloy types are also nickel-based super-alloys incorporating chromium and iron whose mechanical characteristics and chemical stability at high temperature are close to those of stainless steel and the heat expansion coefficient of at least one of them lower than that of palladium, namely $11.3 \cdot 10^{-6}/°C$.

The hydrogen filtering membrane structures according to the invention are not exclusively intended for combustible gas processors producing pure hydrogen. In fact, these structures shall advantageously be used in combustible gas processors carrying out the following reactions:

the catalytic vapour-reforming of hydro carbons or alcohols,
the dehydrogenation of ethane,
the dehydrogenation of propane,
the dehydrogenation of cyclohexane,
the dehydrogenation of ethylbenzene,
the conversion of carbon monoxide by the "water-gas shift" mentioned earlier.

The above conversion reactions are carried out in the presence of their specific catalysts which are well-known in the industries concerned.

In the case of the conversion of carbon monoxide according to the chemical equation (4) mentioned above, it is to be noted that a simple modification of the architecture of the reaction chamber 65 of the processor is able to embody this conversion. This modification shall firstly consist of replacing the insulated electrodes 78a-b by catalyst baskets identical to those with the reference 80a-b, and secondly of eliminating the electric generator 84 and of replacing the feeding with $CH_4$ of the conditioning cell 88 by CO or by any synthetic gas rich in CO and $H_2$. In the case where the temperature on the reaction chamber would be within a range of between 150 and 300° C., the catalyst used would be a mixture of copper and zinc oxides. However, in this case the effectiveness of membrane structures provided with a palladium or palladium/silver alloy filtering film would no longer be maximum.

So as to adapt the reaction chamber 92 to the treatment of carbon monoxide, catalyst baskets as long and wide as the filtering structures 94a-b-c-d (or even bulk catalyst granules) shall be inserted between these structures, the direction of circulation of the vector gas in these structures being opposite the direction of the current of reactive gases circulating in the chamber.

For these reactions, the benefit of the hydrogen filtering membrane structures according to the invention and likely to be subjected to high temperatures and pressures is as follows: elimination of inverse reactions and movement of the chemical equilibrium in the direction of a more complete reaction of conversion from CO into $CO_2$ and thus a significant increase of the yield of the methods implemented in these processors. This effect increases with the pressure and when the temperature of the reactive mixture is situated inside the ranger of the optimum functioning temperatures of the filtering films of the structures according to the invention.

All the above confirms the advantage for various industries concerning membrane structures according to the invention selectively permeable to hydrogen, said structures possessing an effective filtering film which is both ultra-thin and relatively extensive, occupies a small individual space and which functions without suffering damage at high pressure and operates best at high temperatures.

The invention claimed is:

1. Improved composite membrane structure selectively permeable to hydrogen constituted by a continuous filtering film measuring several microns thick and made of palladium or a palladium-based alloy deposited on a rigid porous refractory substrate connected to a pipe for collecting the extracted hydrogen, wherein:

said substrate is a permeable sintered metallic body provided with good mechanical resistance or open pores measuring between several microns and about ten microns;

a thin metallic film known as the intermediate film with a thickness of between twenty and fifty microns and containing open pores smaller than one micron is deposited on the body of the substrate;

the body of the substrate and said intermediate film are made of a metal or alloy having within the range of use temperatures and pressures of the structure, heat expansion coefficients in the presence of hydrogen which are both compatible with those of palladium;

the material constituting said intermediate film has within said range a satisfactory chemical stability with regard to the filtering film and said body of the substrate.

2. Membrane structure selectively permeable to hydrogen according to claim 1, wherein the heat expansion coefficient of the materials constituting said body of the substrate and the intermediate film is lower than or at the most slightly greater than that of said material constituting said filtering film.

3. Membrane structure selectively permeable to hydrogen according to claim 2, wherein:

said continuous filtering film is made of a palladium-based alloy including silver and/or nickel;

said sintered body of said substrate is embodied from a relatively fine powder with appropriate size grading formed from a nickel-based super-alloy including chromium and iron and in particular from an Inconel 600 powder;

said intermediate film is embodied from an ultra-fine powder with suitable size grading of nickel or a super-alloy similar to the one used for the body of the substrate;

said filtering film is fixed by microwelds to the tops of the surface grains of the intermediate film.

4. Membrane structure selectively permeable to hydrogen according to claim 1, wherein said body of said substrate comprises small veins adapted to improve its permeability.

5. Membrane structure selectively permeable to hydrogen according to claim 1, wherein said substrate comprises a cylindrical rod provided at one extremity with a collar for evacuating the extracted hydrogen and, if appropriate, equipped with a vector gas feed collar at the other extremity.

6. Membrane structure according to claim 5, wherein said cylindrical rod is relatively long and comprises a rigid axial metallic reinforcement adapted to give it good mechanical resistance.

7. Membrane structure selectively permeable to hydrogen according to claim 6, which is in the form of a grid, preferably square and relatively large, constituted by a relatively large number of said rods, placed at a small distance from one another and fixed on two hollow transversal beams respectively allocated on the collection of the extracted hydrogen and to vector gas feeding.

8. Membrane structure according to claim 7, wherein said relatively long rod is of the glove-finger type with vector gas injection, and comprises hollow axial reinforcement and is allocated to said injection and opens into a cavity provided in a cupel welded to said other extremity.

9. Membrane structure selectively permeable to hydrogen according to claim 1, wherein said substrate, which includes a porous body and an intermediate film, is a sealed plate fitted in a metallic border provided with a first orifice connected to a pipe for evacuating the extracted hydrogen and, if appropriate, to another orifice opposite said first connected to a vector gas feeding pipe.

10. Membrane structure according to claim 9, wherein said plate has relatively large dimensions, said substrate being provided with a rigid metallic internal reinforcement adapted to give it good mechanical resistance.

11. Combustible gas processor in which a cold plasma reaction chamber fed in suitable condition by a conditioning cell supplying a primary mixture of said gas, water vapour and air provides a secondary mixture comprising hydrogen and carbon dioxide and carbon monoxide, wherein:

said chamber comprises several membrane structures selectively permeable to hydrogen constituted by a continuous filtering film measuring several microns thick and made of palladium or a palladium-based alloy deposited on a rigid porous refractory substrate connected to a pipe for collecting the extracted hydrogen, said structures having a given shape and dimensions;

placed close to these structures at least one electrode provided with a nonconducting refractory sheath having a high dielectric coefficient and an adapted shape and dimensions enabling them to effectively cooperate with said structures so as to constitute a unit intended to produce in response to an appropriate electric power source barrier electric discharges generating said cold plasma in the spaces separating the electrodes and structures.

12. Combustible gas processor according to claim 11, wherein said reaction chamber encloses at least unit one first comprising an insulated electrode associated with a filtering structure said unit being followed by a second unit comprising an insulated electrode and a basket containing catalyst granules for high temperature "water-gas shift" reaction.

13. Combustible gas processor according to claim 12, wherein said filtering structures and the insulated electrodes have the shape of long pencils assembled so as to form a square grid, comprising a relatively large number of pencils almost touching fixed to two projecting beams which are either neutral gas injection and hydrogen evacuation pipes for the filtering structures or electric insulated linking conductors for the insulated electrodes, said beams being adapted to be mounted secured to a frame installed in the reaction chamber.

14. Hydrogen purification device which comprises a filtering chamber constituted by a refractory casing lagged by a nonconducting coating containing at least one membrane selectively permeable to hydrogen, and constituted by a continuous filtering film measuring several microns thick and made of palladium or a palladium-based alloy deposited on a rigid porous refractory substrate connected to a common hydrogen collector for collecting the extracted hydrogen, said membranes being connected to two common pipes respectively allocated to vector gas feeding and collection of the extracted hydrogen; heating, temperature adjustment and compression means adapted to provide the flow of hydrogen to be purified with a temperature and pressure respectively situated inside pressure and temperature ranges corresponding to the best possible functioning of the membranes wherein:

said heating means include a boiler and a burner associated with high thermic conduction heating pipes passing through the boiler;

said boiler is fed with excess pressure by the hydrogen to be purified and communicates with said filtering chamber via a perforated wall;

said burner is fed by the residual hydrogen evacuated downstream of said filtering chamber by a collecting pipe and by the compressed air provided by a compressor whose flow is dependent on a regulation device controlled by a signal delivered by a thermo couple placed in the filtering chamber;

the chimney of said burner has a ring-shaped section, surrounds said filtering chamber and is lagged by the nonconducting coating.

* * * * *